US010792726B2

(12) United States Patent
Phillips (10) Patent No.: US 10,792,726 B2
(45) Date of Patent: Oct. 6, 2020

(54) METHOD AND SYSTEM FOR MANUFACTURING LAMINATED HEAT EXCHANGERS

(71) Applicant: HS Marston Aerospace Limited, Wolverhampton, West Midlands (GB)

(72) Inventor: Paul A. Phillips, Bromsgrove (GB)

(73) Assignee: HS MARSTON AEROSPACE LIMITED, West Midlands (GB)

( * ) Notice: Subject to any disclaimer, the term of this patent is extended or adjusted under 35 U.S.C. 154(b) by 85 days.

(21) Appl. No.: 15/785,656

(22) Filed: Oct. 17, 2017

(65) Prior Publication Data

US 2018/0111182 A1 Apr. 26, 2018

(30) Foreign Application Priority Data

Oct. 21, 2016 (EP) ..................................... 16195133

(51) Int. Cl.
| | | |
|---|---|---|
| *B21D 53/04* | (2006.01) | |
| *F28D 9/00* | (2006.01) | |
| *F28F 3/08* | (2006.01) | |
| *B23P 15/26* | (2006.01) | |

(52) U.S. Cl.
CPC .............. *B21D 53/04* (2013.01); *B23P 15/26* (2013.01); *F28D 9/005* (2013.01); *F28D 9/0093* (2013.01); *F28F 3/08* (2013.01); *F28F 2275/045* (2013.01); *F28F 2280/04* (2013.01)

(58) Field of Classification Search
CPC .......... F28F 2280/04; F28F 3/08; B21D 53/04
See application file for complete search history.

(56) References Cited

U.S. PATENT DOCUMENTS

| 4,603,460 | A | | 8/1986 | Yano et al. | |
|---|---|---|---|---|---|
| 4,783,904 | A | * | 11/1988 | Kimura | ................. B23P 21/004 198/465.2 |
| 5,242,016 | A | | 9/1993 | Voss et al. | |
| 5,392,849 | A | * | 2/1995 | Matsunaga | ........... F28D 9/0075 165/167 |
| 5,555,504 | A | * | 9/1996 | Lepper | ............... G05B 19/4183 700/115 |

(Continued)

FOREIGN PATENT DOCUMENTS

| DE | 10122059 A1 | * | 2/2002 | ............ B23P 21/004 |
|---|---|---|---|---|
| DE | 10122059 A1 | | 2/2002 | |

(Continued)

OTHER PUBLICATIONS

Machine Translation of WO-2010116459-A1 (Year: 2010).*

(Continued)

*Primary Examiner* — Jacob J Cigna
*Assistant Examiner* — Michael W Hotchkiss
(74) *Attorney, Agent, or Firm* — Cantor Colburn LLP (57) ABSTRACT

An automated method of manufacturing a laminated heat exchanger, wherein a plurality of unassembled parts is provided, said parts comprising a plurality of laminate members, the method comprising: identifying the correct laminate member to be stacked using an identification system; stacking the laminate members using a robot to form a stack comprising the laminate members; checking the quality of the stack using a quality checking system; and joining the laminate members of the stack together.

14 Claims, 3 Drawing Sheets

(56) References Cited

U.S. PATENT DOCUMENTS

| | | | | |
|---|---|---|---|---|
| 5,751,414 | A * | 5/1998 | Nishishita | F28D 1/0341 165/153 |
| 6,094,793 | A * | 8/2000 | Szuba | G05B 19/4083 198/345.3 |
| 6,275,743 | B1 * | 8/2001 | Kondo | B23P 19/001 700/116 |
| 6,293,002 | B1 * | 9/2001 | Oh | B23P 15/26 29/726 |
| 6,332,266 | B1 * | 12/2001 | Park | B23P 15/26 29/726 |
| 6,355,976 | B1 * | 3/2002 | Faris | H01L 23/3672 257/685 |
| 6,732,423 | B2 * | 5/2004 | Saito | B23P 19/001 29/33 L |
| 6,993,405 | B2 * | 1/2006 | Beaulieu | H01L 21/67248 198/300 |
| 7,267,271 | B2 * | 9/2007 | Rhea | G06Q 10/00 235/375 |
| 7,286,888 | B2 * | 10/2007 | Monette | G05B 19/4183 700/115 |
| 7,423,547 | B2 * | 9/2008 | Pavlovic | G06K 19/07345 340/687 |
| 7,432,808 | B2 * | 10/2008 | Posamentier | G06K 19/0723 340/572.1 |
| 7,974,718 | B2 * | 7/2011 | Schweikle | B23P 21/002 700/108 |
| 8,726,976 | B2 | 5/2014 | Schrader et al. | |
| 9,417,016 | B2 | 8/2016 | Scott | |
| 2008/0236802 | A1 | 10/2008 | Koepke et al. | |
| 2010/0319891 | A1 * | 12/2010 | Vironneau | F28D 9/0062 165/167 |
| 2013/0168048 | A1 * | 7/2013 | Velte | F28D 9/0037 165/104.13 |
| 2014/0260115 | A1 * | 9/2014 | Mayhall, III | B65B 27/086 53/492 |
| 2015/0260459 | A1 | 9/2015 | Cameron | |
| 2016/0293352 | A1 * | 10/2016 | Zacharias | F28D 9/0062 |
| 2017/0261272 | A1 * | 9/2017 | Chomette | F28F 21/083 |

FOREIGN PATENT DOCUMENTS

| | | | | |
|---|---|---|---|---|
| GB | | 1131124 A * | 10/1968 | F28F 3/083 |
| JP | | H-08233481 A * | 9/1996 | F28D 9/00 |
| JP | | 11248390 A * | 9/1999 | |
| JP | | H-11248390 A * | 9/1999 | F28D 9/00 |
| JP | | H11248390 A | 9/1999 | |
| WO | | 2010116459 A1 | 10/2010 | |
| WO | WO-2010116459 A1 * | | 10/2010 | F28D 9/005 |

OTHER PUBLICATIONS

Machine Translation of JPH-11248390-A (Year: 1999).*
Machine Translation of DE-10122059-A1 (Year: 2002).*
Machine Translation of JPH-08233481-A (Year: 1996).*
DE-10122059-A1 Machine Translation (Year: 2002).*
JP-11248390-A Machine Translation (Year: 1999).*
Extended European Search Report for International Application No. 16195133.0 dated Apr. 4, 2017, 6 pages.

* cited by examiner

METHOD AND SYSTEM FOR MANUFACTURING LAMINATED HEAT EXCHANGERS

FOREIGN PRIORITY

This application claims priority to European Patent Application No. 16195133.0 filed Oct. 21, 2016, the entire contents of which is incorporated herein by reference.

TECHNICAL FIELD

The present specification relates to an automated method of manufacturing a laminated heat exchanger. It also relates to an automated system for manufacturing a laminated heat exchanger.

BACKGROUND

Laminated heat exchangers are a specific form of heat exchanger, used in for example gas turbine engines, especially those gas turbine engines used in aerospace applications. Laminated heat exchangers have offered significant advantages in terms of packaging, design freedoms and volume/weight reductions over conventionally designed/built heat exchangers.

An example of a known laminated heat exchanger is described in U.S. Pat. No. 9,417,016 or US 2015/0260459. These comprise a plurality of typically planar laminate members that are stacked on top of one another to define a plurality of internal channels. The channels are formed by hollows provided in pairs of laminate members. Sets of such laminate members, each defining either part of a first flow path for a first fluid stream or a second flow path for a second fluid stream, are stacked alternately to produce the heat exchanger. A three dimensional laminated structure is thus built up from the laminated members, and within this structure there are arranged the plurality of channels for the first and second fluid streams. The resulting stack of laminate members defining the interleaved flow paths, is then brazed together to form a laminated heat exchanger.

In the prior art, such a laminated heat exchanger is conventionally manufactured using manual techniques. In these manual methods, a kit of unassembled parts that comprises unassembled laminate members is provided to an operator. The operator then selects laminate members from the kit and stacks them in order on a jig. Pressure is then manually applied to the stack of laminate members and the stack is brazed together to form the laminated heat exchanger.

The present inventor has identified a need to make a quicker, more reliable and more repeatable manufacturing process than the current state of the art.

U.S. Pat. Nos. 4,603,460 and 5,424,016 teach methods of automatically manufacturing components of a heat exchanger. However, neither of these documents relates to manufacturing a laminated heat exchanger. U.S. Pat. No. 8,726,976 teaches a method of manufacturing a component of a heat exchanger. However, this heat exchanger is not a laminated heat exchanger and it is not an automated method.

SUMMARY

In a first aspect, the disclosure provides an automated method of manufacturing a laminated heat exchanger, wherein a plurality of unassembled parts is provided, said parts comprising a plurality of laminate members, the method comprising: identifying the correct laminate member to be stacked using an identification system; stacking the laminate members using a robot to form a stack comprising the laminate members; checking the quality of the stack using a quality checking system; and joining the laminate members of the stack together.

The method may comprise the step of providing the plurality of unassembled parts.

The provided plurality of laminate members may comprise an identification mark allowing respective laminated members to be identified using the identification system.

The identification marks may comprise or consist of bar codes, visual markings, machined codes and/or chemically-etched codes.

The identification marks may be an existing feature of the laminate members.

The identification system may comprise a visual checking system, a bar-code scanner, an optical scanner, a laser scanner and/or a camera.

The provided plurality of laminate members may comprise a quality-checking mark allowing the quality of the stack to be checked using the quality checking system.

The quality-checking marks may comprise or consist of notches and/or holes in the laminate members; the quality checking system may comprise a light detector; the notches and/or holes may be arranged such that when the plurality of laminate members are properly stacked the notches and/or holes align in such a way that a light path is provided through the stack; and the step of checking the quality of the stack may comprise detecting, or at least attempting to detect, the light shining through the light path.

The laminate members may be rigid laminate members.

The method may comprise, picking up one or more of the laminate members of the plurality of unassembled parts using the robot. This may occur after the providing step. This may occur prior to the identifying step. The identifying step may comprise: presenting said picked-up laminate member(s) to the identification system using the robot; and, if the identification system identifies that the laminate member(s) is the correct laminate member(s), stacking said picked-up laminate member(s) using the robot to form the stack.

The identifying step may further comprise: if the identification system identifies that the picked-up laminate member(s) is not correct, not stacking said picked-up laminate member(s) using the robot to form the stack.

The stacking step may comprise: stacking the laminate members on a jig; after the stacking step and before the joining step, placing a top plate on top of the stack and applying a pressure to the stack via the top plate. Said pressure may be continued to be applied during the joining step.

The quality of the stack may include the alignment and/or order of the laminate members.

In a second aspect, the disclosure provides a system for automatically manufacturing at least one laminated heat exchanger, the system comprising: an identification system configured to identify a correct laminate member to be stacked; a robot configured to stack a plurality of laminate members to form a stack comprising the laminate members; a quality checking system configured to check the quality of the stack; and a joining system configured to join the laminate members of the stack together.

The identification system may be configured to identify respective laminate members using respective identification marks that may be present on the laminate members.

The quality checking system may be configured to check the quality of the stack using respective quality-checking marks that may be present on the laminate members.

The system of the second aspect may be used for the method of the first aspect. The system of the second aspect may comprise any of the features discussed in relation to the first aspect. The method of the first aspect may comprise any of the features discussed in relation to the second aspect.

BRIEF DESCRIPTION OF THE DRAWINGS

Certain embodiments will now be described by way of example only and with reference to the accompanying drawings, in which.

DETAILED DESCRIPTION

As mentioned above, in a first aspect, the present disclosure provides an automated method of manufacturing a laminated heat exchanger. A plurality of unassembled parts may be provided, said parts comprising or consisting of a plurality of laminate members. The method comprises: identifying the correct laminate member(s) to be stacked using an identification system; stacking the laminate members using a robot to form a stack comprising the laminate members; checking the quality of the stack using a quality checking system; and joining the laminate members of the stack together to form the laminated heat exchanger.

This automated method increases the speed, reliability and repeatability of the manufacture of the laminated heat exchangers. Even though the design of laminate heat exchangers are significantly quicker to assemble than conventional heat exchanger types, their manufacture is still regarded as labour intensive and is at the mercy of human error. As a result high production rate requirements could in the future put a strain upon manufacturing capability and human errors could result in a reduced yield and the need for rework. This risk is further increased when pressure is applied to the operators because of the production demands. In order to overcome the possibility of manufacturing errors and to ensure that production rates can be met it is proposed that the assembly of laminated heat exchangers is automated using a process and system as described below.

An automated method is one where minimal, and possibly no, operator input is required, at least during normal running of the method. Thus, the present method may be performed without input, or at least substantial input during normal running of the method, from an operator.

The method may manufacture one laminated heat exchanger at a time, or may manufacture multiple laminated heat exchangers simultaneously.

The laminated heat exchanger may be suitable for use in aerospace industry, such as in a gas turbine engine, especially a gas turbine engines used in aerospace applications. The laminated heat exchanger may be an aerospace laminated heat exchanger.

A laminated heat exchanger as discussed herein has a specific meaning. It means a heat exchanger that is made from a plurality of laminate members (which are typically planar but may also be curved) that are stacked on top of one another to define a plurality of internal channels. The channels are formed by hollows provided in pairs of laminate members. Sets of such laminate members, each defining either part of a first flow path for a first fluid stream or a second flow path for a second fluid stream, are stacked alternately to produce the heat exchanger. A three dimensional laminated structure is thus built up from the laminated members, and within this structure there are arranged the plurality of channels for the first and second fluid streams. Heat can then be exchanged between the first and second fluid streams in the respective interleave flow paths. As mentioned in the background section, an example of a known laminated heat exchanger is described in U.S. Pat. No. 9,417,016 or US 2015/0260459.

Thus, the laminated heat exchanger discussed herein should not be read to mean any heat exchanger that comprises a laminated part. Rather, the skilled person would understand that the term "laminated heat exchanger" has a specific meaning in the art of heat exchangers, which is intended to be used herein: the present method is specifically for laminated heat exchangers.

For instance, U.S. Pat. Nos. 5,242,016, 4,603,460 and 8,726,976 disclose that parts of the various heat exchangers disclosed in those documents are made from laminated sheets. However, these documents do not disclose, or relate to, laminated heat exchangers.

The laminate members may be planar or curved. The laminate members may comprise heat transfer elements, such as ribs and/or pegs and/or pins and/or ligaments. The laminate members may comprise any other features typically known in the art. The laminate members may have been etched (such as chemically etched) and/or machined (such as high-speed machined) to produce their desired features. The method may comprise producing the laminate members by etching (such as chemically etching) and/or machining (such as high-speed machining) the laminate members from sheets of material (such as metal, such as aluminium). The laminate members may be made of metal, such as aluminium.

The laminate members may be similarly shaped. The laminate members may have a similar shape when viewed in plan. The laminate members may have a similar, or identical, thickness to each other (the thickness being the maximum thickness of the member (at certain locations, the thickness may be reduced or even zero depending on the shape of the laminate member)).

The identification system may identify the laminate member(s) that should be stacked at a given time, for example which laminate member or members should be stacked next on the stack. The identification system (and/or the controller) may compare the identified laminate member presented to it by the robot to an expected laminate member, which is known to the identification system (and/or the controller) from a design model. The identification system (and/or the controller) may comprise a memory in which the design model is stored. The memory and/or the design model may comprise stored images of the expected laminate members to which the picked-up laminate member(s) can be compared. This is particularly the case where the identification system uses existing identification marks, such as the shape of existing features of the laminate members (see below). The memory and/or the design model may comprise stored codes of the expected laminate members to which the code(s) of the picked-up laminate member(s) can be compared. This is particularly the case where the identification system uses codes (see below).

The robot may be a robotic manipulator. The robot may comprise an arm. The robot may be an x-axis robotic manipulator. The robot may comprise a 6-axis robotic manipulator. The robot may comprise a 6-axis robotic arm manipulator. The robot may be a robot that is capable of picking up one or more laminate member(s) and placing the one or more laminate member(s) on the stack. The robot may comprise a holder for holding or gripping the laminate member(s). The holder may comprise one or more fingers that can grip the laminate member(s) and/or may comprise a vacuum suction pad or a vacuum lifter that can hold and lift the laminate member(s). The robot may be autonomous/automated. The robot may be capable of re-orientating the laminate member(s).

The robot may be one that is not suitable for heavy-duty work, i.e. it does not require a heavy-duty function. The payload capacity may be less than 20 kg, preferably less than 15 kg, preferably less than 10 kg; the payload capacity may be more than 1 kg, preferably more than 5 kg, preferably more than 10 kg; payload capacity may be 1-20 kg, preferably 5-15 kg, preferably 8-12 kg.

The robot may have a reach of 0.5-2 m, preferably 1-1.5 m.

A suitable robot may be one of the above-described type manufactured by Fanuc.

The stack may comprise a first axis that extends generally in a first direction in the height of the stack (e.g. generally normal to the planes defined by the laminate members). The stack may comprise a second axis extending in a second direction that is perpendicular to the first axis and generally parallel to the planes defined by the laminate members. The stack may comprise a third axis extending in a direction that is perpendicular to the first and third axes and also generally parallel to the planes defined by the laminate members. The first axis may be generally vertical during stacking, and the second and third axes may be generally horizontal.

The quality of the stack may include the alignment of the laminate members. The alignment may comprise rotational orientation, e.g. about the first axis. The alignment may comprise linear alignment, e.g. in the direction of the second and/or third axes.

The quality of the stack may include the order of the laminate members. The order of the laminate members should be correct due the identification step prior to stacking; however, this quality-check can be used to ensure no errors were made.

The quality-checking system (and/or the controller) may compare the stack to a stored acceptable quality level. The quality-checking system (and/or the controller) may know the acceptable quality level from a design model. The quality-checking system (and/or the controller) may comprise a memory in which the design model is stored. The memory and/or the design model may comprise stored images of an acceptable quality of stack to which the stack can be compared. This is particularly the case where the quality-checking system uses existing identification marks, such as the shape of existing features of the laminate members (see below). The memory and/or the design model may comprise stored codes or patterns of the expected stack to which the code(s) or pattern(s) of quality-checking marks of the stack can be compared. This is particularly the case where the quality-checking system uses codes or patterns (see below.

Joining the laminate members together may comprise brazing and/or diffusion bonding.

The provided plurality of laminate members may comprise an identification mark allowing respective laminated members to be identified using the identification system. The identification system may be configured to identify respective laminate members using their respective identification marks.

The method may comprise using the identification system to identify the respective laminate member(s) using their respective identification marks. This may occur when the robot picks up a laminate member from the plurality of unassembled parts and presents said laminate member to the identification system. If the laminate member is identified by identification system as being the correct next laminate member for the stack, the robot places the laminate member on the stack. If the laminate member is identified by identification system as not being the correct next laminate member for the stack, the robot does not place the laminate member on the stack. In this case, the identification system may also raise an alarm to alert an operator that the laminate member the robot is currently holding is incorrect.

Each laminate member may comprise an identification mark. Each of the laminate members may comprise different respective identification marks. Alternatively, only different laminate members may comprise different identification marks. Some of the provided laminate members may be identical to each other. These may comprise identical identification marks.

The identification mark may be any mark that can be optically viewed. The identification system may comprise any form of checking system that can check the identification mark, such as an optical or visual checking system.

For instance, it may comprise bar codes. In this case, the identification system may be a bar-code scanner. Additionally or alternatively, the identification mark may be a visual marking. In this case, the identification system may be a visual or optical checking system, such as a camera. Additionally or alternatively, the identification mark may be an etched code (such as a chemically-etched code) and/or a machined code (such as a high-speed machined code). In this case, the identification system may be a visual or optical checking system such as an optical scanner or laser scanner. Using etched or machined codes means that the codes can be added to the laminate members during the etching or machining step of the laminate member-production process discussed above.

Thus, the identification marks may comprise bar codes, visual markings, machined code and/or chemically-etched codes; and/or the identification system may comprise a visual checking system, a bar-code scanner, an optical scanner, a laser scanner and/or a camera. The bar code may be printed bar code stuck on the laminate member(s); however, is the bar code may also be an etched or machined bar code.

The identification mark may be an existing feature of the laminate members. For instance, the shape of the laminate member or the shape of certain existing features of the laminate member may be the identification mark, i.e. the shape of the laminate member (e.g. its outer profile) or the shape of certain existing features of the laminate member may be used to identify the laminate member. For instance, the pattern of pin (or peg) geometry could be read by the identification system (such as a visual checking system, an optical scanner and/or a camera). Other shapes, such as the shape of the ports, tanks, manifolds, core, mounting lugs, etc. could also be used either on their own or in combination.

Using an existing feature as the identification mark means that no additional marking is required. Further, the existing feature that is used may be the very reason why the laminate members need to be identified (i.e. the fact the existing features of the laminate members are different to one another means that the different laminate members need to be identified). It is therefore a more direct way of identifying the correct laminate member, and there is less room for error.

The provided plurality of laminate members may comprise a quality-checking mark allowing the quality of the stack to be checked using the quality checking system. The quality checking system may be configured to check the quality of the stack using the respective quality-checking marks of the laminate members.

The method may comprise using the quality checking system to check the quality of the stack using their respective quality-checking marks. This may occur after the stack has been formed. If the quality of the stack is found to be acceptable, then the stack can be joined together. If the quality of the stack is found not be acceptable, then the stack may not be joined together. In this case, the stack may be adjusted (e.g. the order and/or orientation and/or alignment of the laminate members may be adjusted) and/or an operator may be alerted (e.g. by the quality checking system raising an alarm). Once the adjusted stack is of acceptable quality it can be joined together.

Each laminate member may comprise a quality-checking mark. Each of the laminate members may comprise different respective quality-checking marks. Alternatively, only different laminate members may comprise different quality-checking marks. Some of the provided laminate members may be identical to each other. These may comprise identical quality-checking marks.

The quality-checking mark may be any mark that can be optically viewed. The quality-checking system may comprise any form of checking system that can check the quality-checking mark, such as an optical or visual checking system.

The quality-checking mark may form a pattern or a code (such as a bar code) when the laminate members are stacked. The quality of the stack can be found by checking the pattern or code is correct. The pattern or code (e.g. formed by the notches and/or holes and/or protrusions) may be formed in the periphery (e.g. in the outer perimeter when viewed along the first direction) of the stack.

For instance, the quality-checking mark may be (or may form, when the laminate members are stacked) may comprise bar codes. In this case, the identification system may be a bar-code scanner. Additionally or alternatively, the quality-checking mark may be (or may form, when the laminate members are stacked) a visual marking. In this case, the identification system may be a visual or optical checking system, such as a camera. Additionally or alternatively, the quality-checking mark may be (or may form, when the laminate members are stacked) an etched code, such as a chemically-etched code, or a machined code (such as a high-speed machined code). In this case, the identification system may be a visual or optical checking system such as an optical scanner or laser scanner. Using etched or machined codes means that they can be added to the laminate members during the etching or machining step of the laminate member-production process discussed above.

The quality-checking mark may be the same as the identification mark, i.e. each laminate member may comprise only one mark that is used for two purposes. Alternatively, the identification and quality-checking marks may be different. The quality-checking system may be the same as the identification system. Alternatively, the identification and quality-checking systems may be different.

The quality-checking mark may be an existing feature of the laminate members. For instance, the shape of the laminate member or the shape of certain existing features of the laminate member may be the quality-checking mark, i.e. the shape of the laminate member or the shape of certain existing features of the laminate member may be used to check the quality of the stack. Using an existing feature as the quality-checking mark means that no additional marking is required.

The quality-checking marks may comprise notches and/or holes in the laminate members and/or protrusions from the laminate member. The quality checking system may comprise a light source and a light detector. The notches and/or holes and/or protrusions may be arranged such that when the plurality of laminate members are properly stacked the notches and/or holes and/or protrusions align in such a way that a light path is provided through the stack. The step of checking the quality of the stack may comprise detecting light through the light path.

The quality-checking marks (e.g. the notches and/or holes and/or protrusions) may be formed in the periphery (e.g. in the outer perimeter when viewed along the first direction) of the laminate members. This may ensure that a code or pattern is formed on the outer periphery of the stack when the stack is formed.

The light path may extend through the stack member generally at least partially in the first direction. The light may extend through the stack from one side to the other (e.g. from the top of the stack to the bottom, e.g. from the uppermost member through to the lowermost member). The light path may be a straight path, or may be a curved path.

The light detector may detect light intensity and/or light pattern. If the holes and/or notches and/or protrusions are not properly aligned (e.g. if the stack is not of an acceptable quality) the light signal detected may change in intensity or in pattern from an expected intensity or pattern. The light source may shine light into one end of the light path, and the detector may be located at the other far end of the light path.

The laminate members may be rigid laminate members. The laminate members may be made from metal, such as aluminium. The rigid laminate members may be inflexible under their own weight, i.e. they are capable of supporting at least their own weight without bending, e.g. when picked up by the robot. The rigidity may be provided by the properties of the material of the laminate members, and by the laminate members having a sufficient thickness.

After the providing step, the method may comprise picking up one or more of the laminate members of the plurality of unassembled parts using the robot. This may be the next step after the providing step (e.g. it may be immediately after the providing step). A plurality of, or only one of, the laminate members may be picked up at a given time. The identifying step may comprise: presenting said picked-up laminate member(s) to the identification system using the robot; and, if the identification system identifies that the laminate member(s) is the correct laminate member(s), stacking said picked-up laminate member(s) using the robot to form the stack.

If the identification system identifies that the picked-up laminate member(s) is not correct, the method may comprise not stacking said picked-up laminate member(s) using the robot to form the stack. Instead, the identification system may raise an alarm to alert an operator that the laminate member the robot is currently holding is incorrect, and/or may pick up a different laminate member.

The stacking step may comprise stacking the laminate members on a jig (e.g. a brazing and/or diffusion bonding jig). After the stacking step and before the joining step (and after the quality-checking step), the method may comprise placing a top plate on top of the stack (this may be performed automatically, e.g. by the robot) and applying a pressure to the stack via the top plate (this may be performed automatically). Said pressure may be continued to be applied during (and possibly throughout the entirety of) the joining step. Said pressure may be sufficient to hold the stack together during the joining step.

The jig may comprise the top plate. The jig may comprise a bottom plate.

As mentioned above, in a second aspect, the disclosure provides a system for automatically manufacturing at least one laminated heat exchanger. The system comprises: an identification system configured to identify a correct laminate member(s) to be stacked; a robot configured to stack a plurality of laminate members to form a stack comprising the laminate members; a quality checking system configured to check the quality of the stack; and a joining system configured to join the laminate members of the stack together.

An automated system is one where minimal, and possibly no, operator input is required, at least during normal functioning of the system. Thus, the present system may function without input, or at least substantial input during normal running of the system, from an operator.

The system may be able to manufacture one laminated heat exchanger at a time, or may manufacture multiple laminated heat exchangers simultaneously.

The identification system may be configured to identify the laminate member(s) that should be stacked at a given time, for example which laminate member or members should be stacked next on the stack.

The robot may be a robotic manipulator. The robot may comprise an arm. The robot may be a robot that is capable of picking up one or more laminate member(s) and placing the one or more laminate member(s) on the stack. The robot may comprise a holder for holding or gripping the laminate member(s). The holder may comprise one or more fingers that can grip the laminate member(s) and/or may comprise a vacuum suction pad or a vacuum lifter that can hold and lift the laminate member(s). The robot may be autonomous/automated, i.e. it may function without any substantial user input.

The joining system may comprise a brazing and/or diffusion bonding system.

The identification system may be configured to identify respective laminate members using respective identification marks that may be present on the laminate members.

The system may comprise a kit of comprising the plurality of unassembled parts that comprises the plurality of laminate members. The plurality of laminate members may comprise the identification marks allowing respective laminated members to be identified using the identification system. The method of the first aspect may comprise providing such a kit.

The identification system may be configured to identify whether a laminate member that is picked up and presented to it by the robot is the correct next laminate member for the stack. If the laminate member is identified by identification system as being the correct next laminate member for the stack, the robot is configured to place the laminate member on the stack. If the laminate member is identified by identification system as not being the correct next laminate member for the stack, the robot is configured to not place the laminate member on the stack. In this case, the identification system may also be configured to raise an alarm to alert an operator that the laminate member the robot is currently holding is incorrect.

Each laminate member may comprise an identification mark. Each of the laminate members may comprise different respective identification marks. Alternatively, only differently-shaped laminate members may comprise different identification marks. Some of the provided laminate members may be identical to each other. These may comprise identical identification marks.

The identification mark may be any mark that can be optically viewed. The identification system may comprise any form of checking system that can check the identification mark, such as an optical or visual checking system.

For instance, it may comprise bar codes. In this case, the identification system may be a bar-code scanner. Additionally or alternatively, the identification mark may be a visual marking. In this case, the identification system may be a visual or optical checking system, such as a camera. Additionally or alternatively, the identification mark may be an etched code, such as a chemically-etched code, or a machined code, such as a high-speed machined code. In this case, the identification system may be a visual or optical checking system such as an optical scanner or laser scanner. Using etched or machined codes means that they can be added to the laminate members during the etching or machining step of the laminate member-production process discussed above.

Thus, the identification marks may comprise bar codes, visual markings, machined codes and/or etched codes; and/or the identification system may comprise a visual checking system, a bar-code scanner, an optical scanner, a laser scanner and/or a camera.

The identification mark may be an existing feature of the laminate members. For instance, the shape of the laminate member or the shape of certain existing features of the laminate member may be the identification mark, i.e. the shape of the laminate member or the shape of certain existing features of the laminate member may be used to identify the laminate member. For instance, the pattern of pin (or peg) geometry could be read by the identification system (such as a visual checking system, an optical scanner and/or a camera). Other shapes, such as the shape of the ports, tanks, manifolds, core, mounting lugs, etc. could also be used either on their own or in combination.

Using an existing feature as the identification mark means that no additional marking is required. Further, the existing feature that is used may be the very reason why the laminate members need to be identified (i.e. the fact the existing features of the laminate members are different to one another means that the different laminate members need to be identified). It is therefore a more direct way of identifying the correct laminate member, and there is less room for error.

The quality checking system may be configured to check the quality of the stack using respective quality-checking marks of the respective laminate members.

The system may comprise a kit of the plurality of unassembled parts that comprises the plurality of laminate members. The plurality of laminate members may comprise the quality-checking marks allowing the quality of the stack to be checked using the quality checking system.

The quality checking system may be configured to use the quality checking system to check the quality of the stack using their respective quality-checking marks. This may occur after the stack has been formed. If the quality of the stack is found to be acceptable, then the stack can be joined together. If the quality of the stack is found not be acceptable, then the stack may not be joined together. In this case, the stack may be adjusted (e.g. the order and/or orientation and/or alignment of the laminate members may be adjusted, e.g. by the robot, the jig and/or the operator) and/or an operator may be alerted (e.g. by the quality checking system raising an alarm). Once the adjusted stack is of acceptable quality it can be joined together.

Each laminate member may comprise a quality-checking mark. Each of the laminate members may comprise different respective quality-checking marks. Alternatively, only differently-shaped laminate members may comprise different quality-checking marks. Some of the provided laminate members may be identical to each other. These may comprise identical quality-checking marks.

The quality-checking mark may be any mark that can be optically viewed. The quality-checking system may comprise any form of checking system that can check the quality-checking mark, such as an optical or visual checking system.

For instance, the quality-checking mark may comprise bar codes. In this case, the identification system may be a bar-code scanner. Additionally or alternatively, the quality-checking mark may be a visual marking. In this case, the identification system may be a visual or optical checking system, such as a camera. Additionally or alternatively, the quality-checking mark may be an etched code, such as a chemically-etched code, or machined code, such as a high-speed machined code. In this case, the identification system may be a visual or optical checking system such as an optical scanner or laser scanner. Using etched or machined codes means that they can be added to the laminate members during the etching or machining step of the laminate member-production process discussed above.

The quality-checking mark may be the same as the identification mark, i.e. each laminate member may comprise only one mark that is used for two purposes. Alternatively, the identification and quality-checking marks may be different. The quality-checking system may be the same as the identification system. Alternatively, the identification and quality-checking systems may be different.

The quality-checking mark may be an existing feature of the laminate members. For instance, the shape of the laminate member or the shape of certain existing features of the laminate member may be the quality-checking mark, i.e. the shape of the laminate member or the shape of certain existing features of the laminate member may be used to check the quality of the stack. Using an existing feature as the quality-checking mark means that no additional marking may be required.

The quality-checking marks may comprise notches and/or holes in the laminate members and/or protrusions from the laminate members. In this case, the quality checking system may comprise a light source and a light detector. The notches and/or holes and/or protrusions may be arranged such that when the plurality of laminate members are properly stacked the notches and/or holes and/or protrusions align in such a way that a light path is provided through the stack. The quality checking system may be configured to shine light through the light path and detect light passing through the light path.

The quality-checking marks (e.g. the notches and/or holes and/or protrusions) may be formed in the periphery (e.g. in the outer perimeter when viewed along the first direction) of the laminate members. This may ensure that a code or pattern is formed on the outer periphery of the stack when the stack is formed.

The light path may extend through the stack member generally at least partially in the first direction. During use, the light path may extend through the stack from one side to the other (e.g. from the top of the stack to the bottom, e.g. from the uppermost member through to the lowermost member). The light path may be straight, or may be curved.

The light detector may detect light intensity. If the holes and/or notches and/or protrusions are not properly aligned (e.g. if the stack is not of an acceptable quality) the light signal detected may not be intense enough.

The laminate members may be rigid laminate members. The laminate members may be made from metal, such as aluminium.

The robot may be configured to pick up one or more of the laminate members of the plurality of unassembled part (e.g. provided in a kit) using the robot. A plurality of, or only one of, the laminate members may be picked up at a given time. The robot may be configured to present said picked-up laminate member(s) to the identification system and, if the identification system identifies that the laminate member(s) is the correct laminate member(s), stacking said picked-up laminate member(s) to form the stack.

If the vision checking system identifies that the picked-up laminate member(s) is not correct, the robot may be configured not to stack said picked-up laminate member(s) using the robot to form the stack. Instead, the identification system may be configured to raise an alarm to alert an operator that the laminate member the robot is currently holding is incorrect, and/or instruct the robot to pick up a different laminate member.

The quality checking system may comprise a light source and a light detector that are configured to check proper stacking of the laminate members by shining light through a light path in the stack and detecting said light shone through the light path in the stack.

The system may comprise a jig on which the laminate members may be stacked. The system may comprise a top plate for placing on top of the stack after the stack has been completed (and quality checked). The robot may be configured to place the top plate on the stack. The top plate may be configured to apply pressure to the stack via the top plate. This may be done automatically, e.g. by the robot. The top plate may be configured to continue to apply the pressure during (and possible throughout) the joining step.

The system may also comprise a system for forming the laminate members, e.g. by etching and/or machining sheets of material.

The system may comprise an alerting device, such as an alarm (which may be visual and/or audio) for alerting the operator if the incorrect laminate member is picked up by the robot and/or if the quality of the stack is not acceptable.

The system may comprise a controller. The controller may comprise a processor. The controller may be programmed to automatically control the various components, such as the robot, the identification system, the quality-checking system and/or the joining system. The controller may be in communication with and may be used to receive signals from and to control the robot, the alerting device, the jig, the top plate, the joining system, the identification system and/or the quality-checking system. The controller may be at least substantially autonomous such that it can control the system without the need for any substantial operator input, at least during normal use.

The robot, the controller, the identification system, the quality-checking system, and/or the joining system may be part of a single piece of apparatus, or may be separate pieces of apparatus. Each of the robot, the identification system, the quality-checking system and/or the joining system may comprise their own controller (which is in turn connected to a central controller or to the other controller(s)); alternatively, the robot, the identification system, the quality-checking system and/or the joining system may all be connected to an controlled by one single controller.

The system of the second aspect may be used for the method of the first aspect. The system of the second aspect may comprise any of the features discussed in relation to the first aspect. The method of the first aspect may comprise any of the features discussed in relation to the second aspect.

Figure 1:
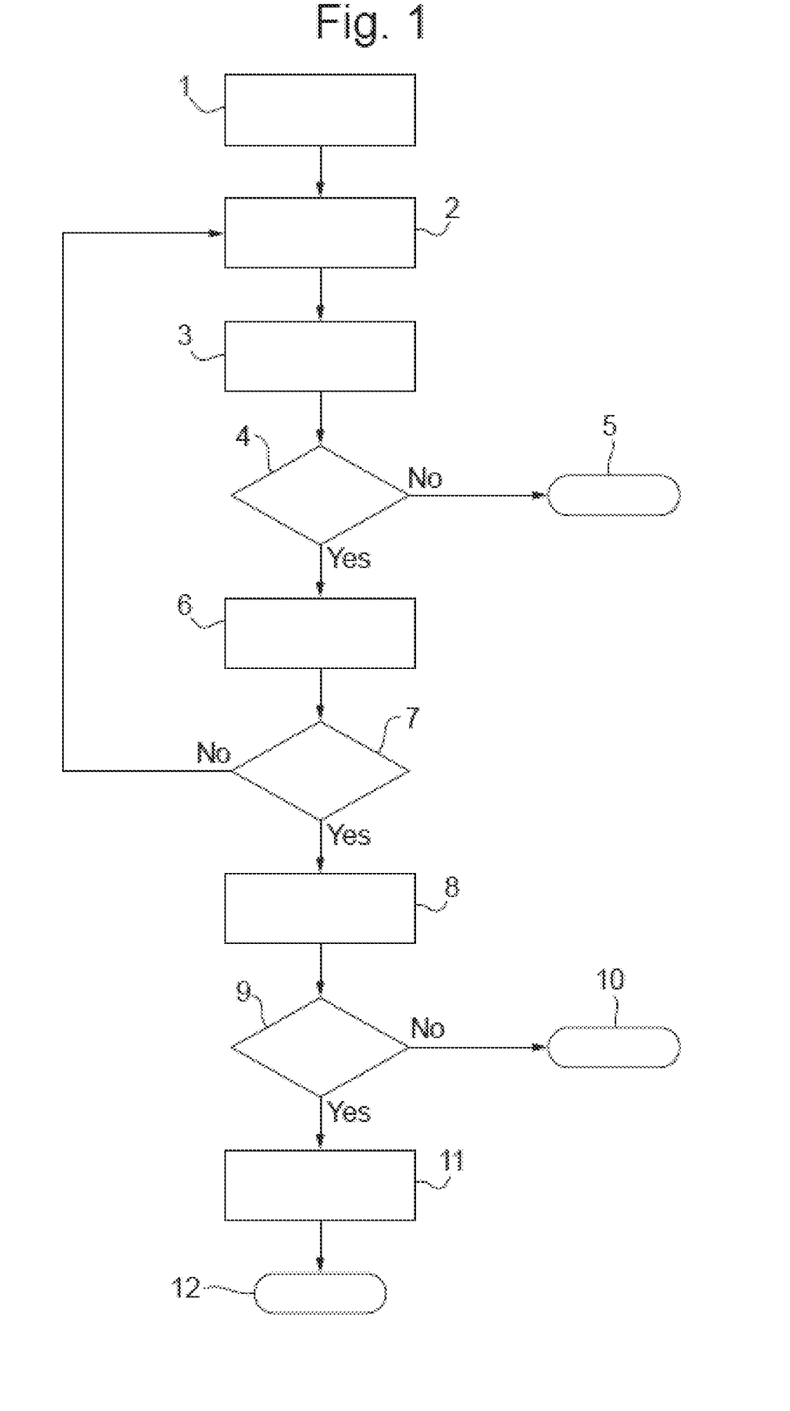
FIG. 1 illustrates a general workflow of an embodiment of the present method.

Regarding FIG. 1, an exemplary workflow of an embodiment of the present automated method is shown.

At step 1, a plurality of unassembled parts (such as a kit of parts) 21, which comprises or consists of a plurality of laminate members 30 for use in forming a stack 40 for forming a laminated heat exchanger, is provided. These laminate members 30 are discussed below in relation to FIG. 2, but each comprises an identification mark 31, 32, 33, 34, 35, 36 for use in identifying the respective laminate members 30 and a quality-checking mark 51 for use in checking the quality of the stack. The plurality of unassembled parts 21 may be a generally correctly ordered unassembled collection of laminate members 30, and possibly other parts.

At step 2, a robotic manipulator arm 22 picks up one of the laminate members 30 of the provided plurality of unassembled parts 21.

At step 3, the robotic manipulator arm 22 presents the picked-up laminate member 30 to an identification system 23.

At step 4, the identification system 23 identifies the picked-up laminate member 30, and a controller 27 decides whether or not the picked-up laminate member 30 is the correct next laminate member 30 to be placed on the stack 40. The identification system 23 and/or the controller 27 may compare the identified laminate member 30 presented to the system 23 by the robot 22 to an expected laminate member, which is known to the identification system 23 and/or the controller 27 from a design model, which may be stored in a memory of the controller and/or the identification system.

If the controller 27 decides that the identified picked-up laminate member 30 is not the correct laminate member 30, the controller 27 alerts the operator at step 5.

If the controller 27 decides that the identified picked-up laminate member 30 is the correct laminate member 30, the controller instructs the robotic manipulator arm 22 to place the picked-up laminate member 30 in a jig 24 where a stack of laminate members is to be formed (or is being formed) at step 6.

At step 7, the controller 27 decides whether or not the stacking of the laminate members 30 in the jig 24 has been completed. If it has not been completed, steps 2-6 are repeated. If it has been completed, then the automated method moves on to step 8.

At step 8, a quality-checking system 25 checks the alignment, stacking order and orientation of the laminate members 30 in the stack 40 to ensure that the stack 40 is of sufficient quality to be joined together to form the laminated heat exchanger. Examples of the quality-checking mechanism 25 are discussed in detail above. The quality-checking system 25 and/or the controller 27 may compare the quality of the stack 40 to an expected or threshold quality, which is known to the quality-checking system 25 and/or the controller 27 from a design model, which may be stored in a memory of the controller and/or the quality-checking system.

At step 9, the controller 27 decides whether or not the quality of the stack 40 is sufficient for it to be joined together to form the laminated heat exchanger.

If the controller 27 decides that the stack is not of sufficient quality, the controller 27 alerts the operator at step 10.

If the controller 27 decides that the stack is of sufficient quality, the controller instructs a top plate to be secured to the stack 40 at step 11. The top plate may be secured by the robot arm 22, or by an automatic system in the jig. The top plate is secured to the stack 40 via the jig such that pressure is applied to the stack 40 before and during the joining process. The top plate may be secured to the stack 40 via the jig 24 using automatic pneumatic screws. These may have torque feedback.

The quality-checking step may be performed before and/or after the top-plate is secured and the pressure is supplied.

At step 12, once the top plate is secured, the stack 40 is joined together using a brazing process.

The output from step 12 is a completed laminated heat exchanger.

Figure 2:
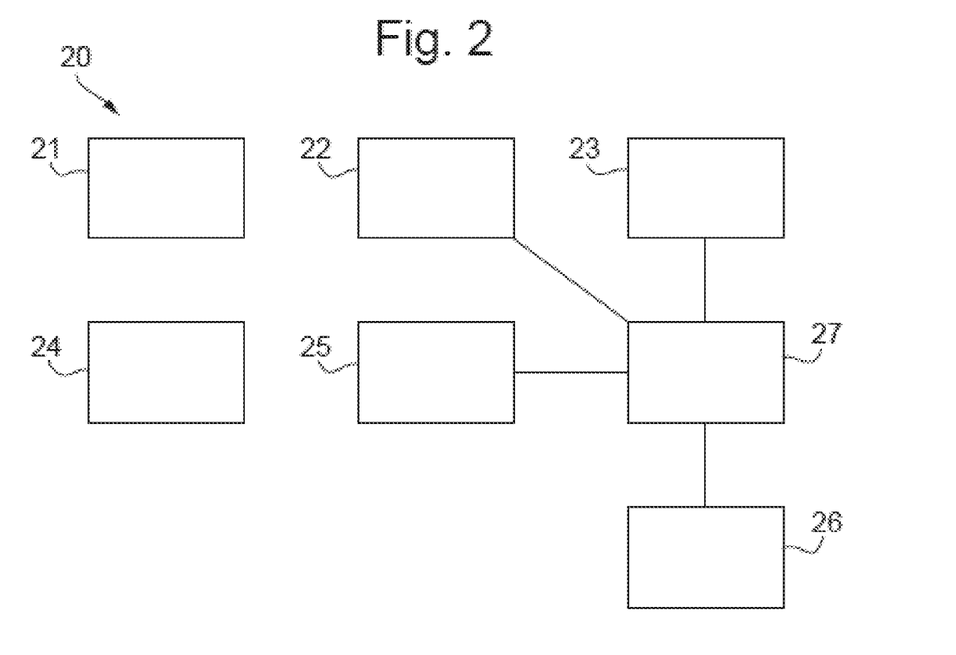
FIG. 2 shows a schematic view of an exemplary embodiment of the present system.

Regarding FIG. 2, a schematic view of a system 20 is shown.

The system 20 comprises a plurality of unassembled parts (such as a kit) 21 of unassembled parts comprising a plurality of laminate members 30 each having identification markings 31, 32, 33, 34, 35, 36 (see FIG. 3, which is described further below) and quality-checking markings 51 (which is provided on a peripheral edge of the laminate members 30).

The system 20 comprises a robotic arm manipulator 22 for picking up laminate members 30 and moving them to different parts of the system for different stages in the method.

The system 20 comprises an identification system 23 for identifying a picked-up laminate member 30 using its identification mark 31, 32, 33, 34, 35, 36.

The system 20 comprises a jig 24 in which the laminate members 30 are stacked.

The system 20 comprises a quality-checking system 25 for checking the quality of the stack 40 in the jig 24.

The system 20 comprises a brazing system 26 into which the stack 40 and the jig 24 may be placed to braze the stack 40 together to form a laminated heat exchanger.

The system 20 comprises a controller 27 in communication with the robot 22, the identification system 23, the quality-checking system 25 and the brazing system 26. The controller 27 may decide whether the correct laminate member 30 is held by the robot 22 when the robot 22 presents the laminate member 30 to the identification system 23. The controller 27 may control the robot arm 22. The controller 27 may decide whether the stack 40 is of sufficient quality to be joined together when the quality of the stack 40 is checked by the quality-checking system 25. The controller 27 may control the closing of the top plate on the stack 40 and the pressurisation of the stack 40 on the jig 24. The controller 27 may control the brazing system 26.

Figure 3:
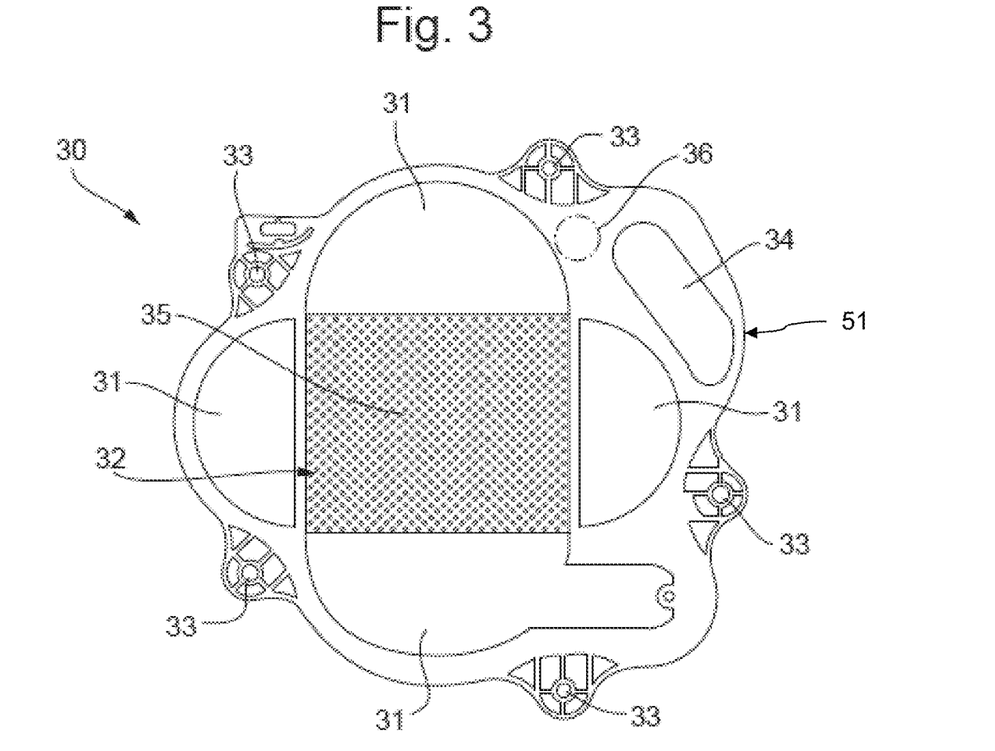
FIG. 3 shows an example of a laminate member that can be used for the present method.

FIG. 3 shows an exemplary laminate member 30. The laminate member 30 is rigid and made from chemically-etched aluminium. The laminate member 30 comprises a plurality of features that when placed in a stack with other laminate members form tanks or manifolds 31; a core 32 where heat is to be exchanged between two or more fluid paths; mounting lugs 33 for attaching the laminated heat exchanger to an engine; and inlet or outlet port 34. The core 32 comprises a plurality of heat transfer elements 35, such as ribs and/or pegs and/or pins and/or ligaments.

The shape of the features 31, 32, 33, 34, 35 may vary from one laminate member to another, which may be the reason why the order of stacking the laminate members is so crucial.

These existing features 31, 32, 33, 34, 35 can be used as the identification markings for the laminate member 30. In particular the features of the core, such as the heat transfer elements 35, such as the pattern of the ribs and/or pegs and/or pins and/or ligaments, can be used as the identification markings of the laminate members 30. Said pattern may vary between different laminate members.

Alternatively/additionally, an identification mark can be provided on the laminate member 30, for instance on the surface of the material of the laminate member 30, such as at location 36. This mark may be bar code or chemically-etched code.

Figure 4:
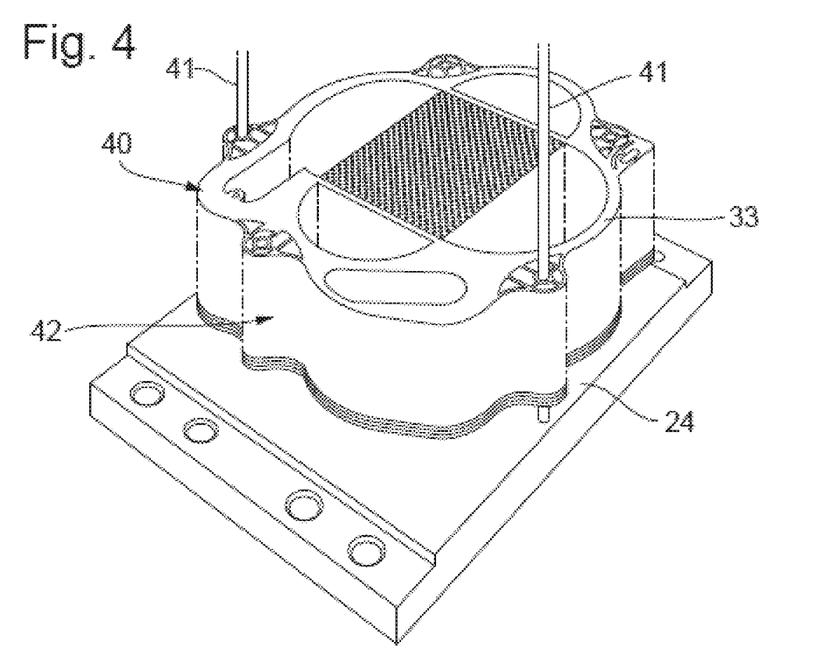
FIG. 4 shows a plurality of the laminate members stacked in a jig.

FIG. 4 shows a partially-completed stack 40 of said laminate members 30. The stack 40 is formed on a jig 24. The jig 24 comprises a plurality of bars 41 that extend generally in the first direction (e.g. vertically in FIG. 4). Regarding the stack 40, the tanks, manifolds, core, mounting lugs and inlet/outlet port can be seen taking shape.

Figure 5:
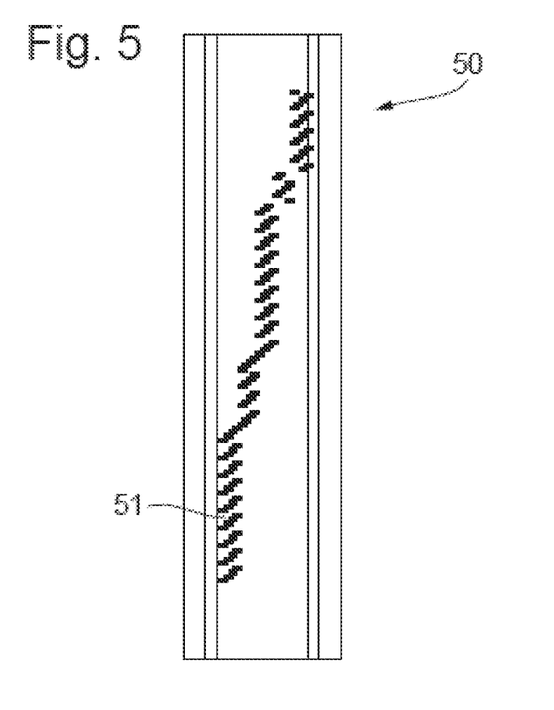
FIG. 5 shows an exemplary quality-checking marker pattern of a stack.

FIG. 5 shows a portion 50 of the outside surface 42 of the stack 40. The portion 50 shows a plurality of quality-checking markings 51. Each laminate member 30 may comprise one or more quality-checking mark 51 on an outer rim of the laminate member 30. As can be seen from FIG. 5, when the laminate members 30 are stacked 40, the quality-checking marks 51 may form a pattern on the outside surface 42 of the stack 40. This pattern can be viewed by the quality-checking system 25 to see if the correct laminate members 30 are in the correct orientation, order and position in the stack 40. For instance, this pattern can be scanned by a laser scanner in a similar way to a bar code. The pattern can be compared to a stored expected (or quality threshold) pattern stored in the memory of the controller 27 and/or quality-checking system 25.

Other quality-checking marks (such as notches and/or holes forming a light path and/or protrusions) and other quality-checking systems (such as a light source and light detector) may also be used. For instance, the holes may be one or more of the mounting lugs 33 (or any other existing hole, or indeed a specially-formed hole) that forms of a light path through the stack 40 from one side to the other, as discussed above.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An automated method of manufacturing a laminated heat exchanger, wherein a plurality of unassembled parts are provided, said unassembled parts comprising a plurality of laminate members, the method comprising:
   identifying the correct laminate member to be stacked using an identification system, wherein the identification system is automatically controlled by a controller;
   stacking the laminate members using a robot to form a stack comprising the laminate members;
   checking the quality of the stack using a quality checking system; and
   joining the laminate members of the stack together; and
   picking up one or more of the laminate members of the plurality of unassembled parts using the robot;
   wherein the identifying step comprises:
   presenting said picked-up laminate member(s) to the identification system using the robot;
   when the identification system identifies that the laminate member(s) is the correct laminate member(s), stacking said picked-up laminate member(s) using the robot to form the stack; and
   when the identification system identifies that the picked-up laminate member(s) is not correct, not stacking said picked-up laminate member(s) using the robot to form the stack.

2. A method as claimed in claim 1, wherein the identification system comprises least one of: a visual checking system, a bar-code scanner, an optical scanner, a laser scanner or a camera.

3. A method as claimed in claim 1, wherein the laminate members are rigid laminate members.

4. A method as claimed in claim 1, wherein:
   the stacking step comprises stacking the laminate members on a jig;
   after the stacking step and before the joining step, placing a top plate on top of the stack and applying a pressure to the stack via the top plate; and
   said pressure is continued to be applied during the joining step.

5. A method as claimed in claim 1, wherein the quality of the stack includes the alignment and/or order of the laminate members.

6. A method as claimed in claim 1, wherein the provided plurality of laminate members comprise a quality-checking mark allowing the quality of the stack to be checked using the quality checking system.

7. A method as claimed in claim 6, wherein the quality-checking marks are notches or holes in the laminate members; wherein the quality checking system comprises a light detector; wherein the notches or holes are arranged such that when the plurality of laminate members are properly stacked the notches or holes align in such a way that a light path is provided through the stack; and wherein the step of checking the quality of the stack comprises detecting the light shining through the light path.

8. A method as claimed in claim 1, wherein the provided plurality of laminate members comprise an identification mark allowing respective laminated members to be identified using the identification system.

9. A method as claimed in claim 8, wherein the identification marks are bar codes, visual markings, machined codes, and/or chemically-etched codes or a combination thereof.

10. A method as claimed in claim 8, wherein the identification marks comprise an existing feature of the laminate members.

11. A system for automatically manufacturing at least one laminated heat exchanger, the system comprising:
- an identification system configured to identify correct laminate members to be stacked from a plurality of unassembled parts;
- a robot configured to: pick up one or more of the laminate members of the plurality of unassembled parts; present said picked-up laminate member(s) to the identification system; when the identification system identifies that the laminate members are the correct laminate members to stack a plurality of laminate members to form a stack comprising the laminate members; and when the identification system identifies that the picked-up laminate member(s) is not correct, not stacking said picked-up laminate member(s) using the robot to form the stack;
- a quality checking system configured to check the quality of the stack;
- a joining system configured to join the laminate members of the stack together; and
- a controller programmed to automatically control the identification system.

12. A system as claimed in claim 11, wherein the quality checking system is configured to check the quality of the stack using respective quality-checking marks that may be present on the laminate members.

13. A system as claimed in claim 11, wherein the identification system is configured to identify respective laminate members using respective identification marks that may be present on the laminate members.

14. A system as claimed in claim 13, wherein the quality checking system is configured to check the quality of the stack using respective quality-checking marks that may be present on the laminate members.

* * * * *